United States Patent [19]

Liu

[11] Patent Number: 5,507,966
[45] Date of Patent: Apr. 16, 1996

[54] ELECTROLYTE FOR AN ELECTROLYTIC CAPACITOR

[75] Inventor: Yanming Liu, Mundelein, Ill.

[73] Assignee: Boundary Technologies, Inc., Buffalo Grove, Ill.

[21] Appl. No.: 407,975

[22] Filed: Mar. 22, 1995

[51] Int. Cl.⁶ .................................................. H01G 9/145
[52] U.S. Cl. ........................ 252/62.2; 429/195; 429/197
[58] Field of Search ............................ 252/62.2; 429/194, 429/195, 197

[56] References Cited

U.S. PATENT DOCUMENTS

| | | |
|---|---|---|
| 1,829,177 | 10/1931 | Yngve . |
| 1,973,602 | 9/1934 | Bergstein . |
| 2,036,669 | 4/1936 | Yngve . |
| 3,487,270 | 12/1969 | Alwitt . |
| 3,546,119 | 12/1970 | Chesnot . |
| 3,547,423 | 12/1970 | Jenny et al. . |
| 3,585,459 | 10/1971 | Hills et al. ........................ 252/62.2 |
| 3,638,077 | 1/1972 | Chesnot . |
| 3,696,037 | 10/1972 | Lagercrantz et al. . |
| 3,702,426 | 11/1972 | Ross et al. . |
| 3,835,055 | 9/1974 | Chesnot . |
| 4,024,442 | 5/1977 | Anderson . |
| 4,664,830 | 5/1987 | Shinozaki et al. . |
| 4,786,428 | 11/1988 | Shinozaki et al. . |
| 4,812,951 | 3/1989 | Melody et al. . |
| 4,831,499 | 5/1989 | Morimoto et al. . |
| 4,860,169 | 8/1989 | Dapo . |
| 5,112,511 | 5/1992 | Shinozaki et al. . |
| 5,177,673 | 1/1993 | Nagara et al. ........................ 252/62.2 |

FOREIGN PATENT DOCUMENTS

| | | |
|---|---|---|
| 62-268121 | 11/1987 | Japan . |
| 2-312218 | 12/1990 | Japan . |
| 5-62862 | 3/1993 | Japan . |

*Primary Examiner*—Stephen Kalafut
*Assistant Examiner*—Alan D. Diamond
*Attorney, Agent, or Firm*—Middleton & Reutlinger; Charles G. Lamb

[57] ABSTRACT

An electrolyte for aluminum electrolytic capacitors comprises 2-methyl-1,3-propanediol, ethylene glycol, and an ammonium salt of a straight chain dicarboxylic acid or a branched chain di- or polycarboxylic acid. Electrolytic capacitors including this composition are useful for high voltage at relatively low temperatures.

14 Claims, No Drawings

ELECTROLYTE FOR AN ELECTROLYTIC CAPACITOR

BACKGROUND OF THE INVENTION

This invention relates to an electrolyte for electrolytic capacitors and more particularly for an electrolyte for high voltage aluminum electrolytic capacitors.

Electrolytic capacitors are well known for use in a variety of electronic equipment used for data processing, communication, entertainment and power electronics. Generally, these capacitors are made of a capacitor element which is comprised of anode and cathode foils separated by layer(s) of spacer paper. The electrode foils are generally made of aluminum which has undergone etching to increase surface area. The anode foil has undergone an additional formation process to grow an anodic barrier oxide layer that serves as the capacitor dielectric. Short lengths of wire or strips of narrow sheet stock, mechanically bonded to the lengths of anode and cathode foil in the capacitor element, are used to make electrical connection to the external circuit. The capacitor element is placed into a protective case. Depending upon the capacitor design and size, electrolyte is impregnated into the capacitor element either before or after it is placed in the case. Details of capacitor design and assembly procedures vary with manufacturer. Generally, if wire connectors are used, they pass through an elastomer seal in the top of the case. If narrow sheet strip is used for electrical connection, it is welded or riveted to terminals embedded in a rigid polymer cover. The cover is then tightly sealed to the case.

Current capacitor technology teaches use of electrolytes containing ethylene glycol and a co-solvent for high voltage use. The solutes used in these electrolytes are salts of boric acid or dicarboxylic acids, or mixtures thereof.

U.S. Pat. No. 3,487,270 teaches the use of polyalkylene glycols as a co-solvent for high voltage electrolytes and particularly a polyethylene glycol having a molecular weight of greater than 2000 as a co-solvent in a glycol borate electrolyte. Japanese Pat. No. JP62268121 [87268121] teaches the use of a polyethylene glycol having a molecular weight of 400 in a high voltage electrolyte and Japanese Pat. No. JP02312218 [90312218] teaches the use of polyethylenepropylene glycol having a molecular weight of 1000 to 4000. However, these co-solvents all cause the electrolyte to have a high resistance at low temperatures, e.g. −25° C. The result is that the capacitor equivalent series resistance (ESR) is too high and the capacitance is too low for the capacitor to be useful in an electronic circuit operated at low temperature.

Moreover, Japanese Pat. No. JP0562862 [9362862] teaches the use of 2,2-dimethy-1,3-propanediol; 2-butyl-2-ethyl-1,3-propanediol; and 2,3-dimethyl-2,3-butanediol co-solvents in a capacitor electrolyte, but these solvents have high melting points and cause poor low temperature properties.

SUMMARY OF THE INVENTION

It is an object of the present invention to provide an electrolyte for use in an aluminum electrolytic capacitor.

It is another object of the present invention to provide an electrolyte for use in an aluminum electrolytic capacitor which operates at 400v and higher.

It is even another object of the present invention to provide high voltage electrolytes that can be used at temperatures below −25° C., and down to −45° C.

An even further object of the present invention is to provide electrolytes that can be used in capacitors for prolonged operation at 105° C.

Even another object of the present invention is to provide electrolytes for use at high voltage that do not degrade the low temperature properties of the capacitor.

It is also an object of the present invention to provide an electrolyte composition which is low in cost and includes components thereof which are easily obtainable.

More particularly, the present invention is directed to an electrolyte composition for an electrolytic capacitor comprising:

2-methyl-1,3-propanediol, ethylene glycol and an ammonium salt of a di- or a polycarboxylic acid.

DETAILED DESCRIPTION OF THE PREFERRED EMBODIMENT

Generally, the present invention relates to an electrolyte for use in aluminum electrolytic capacitors for use at relatively high voltage, particularly 400V and higher. More particularly, the present invention relates to an electrolyte with good low temperature performance.

The electrolyte comprises a co-solvent system including ethylene glycol and 2-methyl-1,3-propanediol in combination with an ammonium salt of a di or polycarboxylic acid. Specifically, it has been found that the concentration of ethylene glycol in the electrolyte composition is from about 10 to 90 percent by weight, the 2-methyl-1,3-propanediol is from about 5 to 80 percent by weight and the ammonium salt of a dicarboxylic or polycarboxylic acid is from about 1 to 10 percent total weight of the electrolyte. Water may also be used in concentrations up to 5 percent by weight.

The co-solvent system of the present invention includes the two solvents ethylene glycol and 2-methyl-1,3-propanediol. The ratio of the ethylene glycol: 2-methyl-1,3-propanediol is from 9:1 to 2:8 by volume.

The ammonium salts of carboxylic acid particularly useful in the instant invention are those of straight or branched chain di or polycarboxylic acids. Specifically the carboxylic acids considered to be useful in the instant invention are the weaker acids which withstand higher voltages. Particularly, these include straight chain dicarboxylic acids having at least 4 carbon atoms as well as branched chained di- or polybasic acids in which the $CO_2H$ groups are separated by an alkyl chain having 2 or more carbon atoms. The acids having tertiary and/or quaternary α-carbon(s) are preferred because the alkyl groups at α-carbons(s) donate electrons and weaken the acids. The preferred straight chain dicarboxylic acids of the present invention are those acids having 9 or more carbon atoms. The preferred branched chain acids of the present invention include those having 4 or more carbon atoms between the $CO_2H$ groups and having tertiary and/or quaternaryα-carbons(s). These acids are suitable for applications for 450V and higher.

An electrolyte composition using the co-solvent system of the present invention has higher breakdown voltage than an electrolyte composition using only ethylene glycol as the solvent. It is believed that the improved high voltage performance is due to the ability of the 2-methyl-1,3-propanediol to increase the viscosity of the electrolyte. Moreover, the 2-methyl-1,3-propanediol is a branched chained diol having the combination of high viscosity (168 CP @25° C.) and a wide liquid range from −91° C. to 213° C. This unique property allows 2-methyl-1,3 propanediol to enhance breakdown voltage without degrading low temperature properties.

The electrolyte compositions of the present invention may include borate compounds, such as ammonium pentaborate and boric acid to improve thermal stability of the electrolytes. Also, depolarizers, such as aromatic nitro compounds can be included as an optional component.

EXAMPLES

The following examples illustrate some preferred compositions of the electrolyte of the present invention. It should be understood, however, that these examples are given for the purpose of illustration only and the examples are not intended to limit the invention which heretofore has been described.

EXAMPLE I

In this Example a number of electrolytes are illustrated which are useful for electrolytic capacitors at high voltages. Tables 1A and 1B show the different formulations and their specific resistances ($\rho$) and breakdown voltages ($V_b$). In the examples, the ammonium salts of carboxylic acids were prepared in situ by reacting acids with concentrated ammonium hydroxide (28% wt %). The water introduced from an aqueous solution of ammonium hydroxide was about 2 wt%. The salts may also be added directly in the form of a salt or be prepared in situ by reacting the acid with ammonia gas. In these cases, additional water may be needed on the order of 1–3% by wt.

In the examples, $V_b$ was measured at 85° C. with a 1"×1.5" glass-slide sandwich consisting of a formed aluminum foil as anode, etched aluminum foil as cathode, and spacer paper impregnated with test electrolyte.

TABLE 1A

| | ELECTROLYTE COMPOSITION NO. | | | | | | |
|---|---|---|---|---|---|---|---|
| | 1-1 | 1-2 | 1-3 | 1-4 | 1-5 | 1-6 | 1-7 |
| FORMULATIONS: | | | | | | | |
| ethylene glycol, ml | 100 | 70 | 50 | 30 | 70 | 65 | 70 |
| 2-methyl-1,3-propanediol, ml | — | 30 | 50 | 70 | 30 | 35 | 25 |
| Sebacic acid, g. | 4.0 | 4.0 | 4.0 | 4.0 | 1.7 | 4.0 | 3.9 |
| dodecanedioic acid, g. | — | — | — | — | 2.0 | — | — |
| ammonium hydroxide (28%), ml | 2.5 | 2.5 | 2.5 | 2.5 | 2.5 | 2.5 | 2.5 |
| ammonium pentaborate, g. | — | — | — | — | — | 1.5 | — |
| 2-nitrophenol, g. | — | — | — | — | — | — | 0.2 |
| PROPERTIES: | | | | | | | |
| pH | — | 7.5 | — | 7.5 | 8.3 | 6.9 | 7.5 |
| $\rho$ @30° C., $\Omega$-cm | 590 | 900 | 1364 | 2366 | 1115 | 915 | 852 |
| $V_b$, 85° C. | 450 | 500 | 530 | 560 | 500 | 500 | 490 |

TABLE 1B

| | ELECTROLYTE COMPOSITION NO. | | | | |
|---|---|---|---|---|---|
| | 1-8 | 1-9 | 1-10 | 1-11 | 1-12 |
| FORMULATIONS: | | | | | |
| ethylene glycol, ml | 65 | 70 | 70 | 70 | 63 |
| 2-methyl-1,3-propanediol, ml | 35 | 30 | 30 | 30 | 37 |
| azelaic acid, g. | 3.7 | — | — | — | — |
| 2,2,5,5,-tetramethylhexane- | — | 4.0 | — | — | — |
| dioic acid, g. | | | | | |
| camphoric acid, g. | — | — | 4.0 | — | — |
| dodecanedioic acid, g. | — | — | — | 4.7 | — |
| sebacic acid, g. | — | — | — | — | 4.0 |
| ammonium hydroxide (28%) ml | 2.5 | 2.5 | 2.5 | 2.5 | 2.5 |
| ammonium pentaborate, g. | — | — | — | — | 1.5 |
| 2-nitrophenol, g. | — | — | — | — | 0.2 |
| PROPERTIES: | | | | | |
| pH | 7.4 | — | — | — | 6.9 |
| $\rho$ @30° C., $\Omega$-cm | 1030 | 1180 | 1060 | 930 | 990 |
| 85° C. $V_b$ | 490 | 500 | 490 | 490 | 510 |

It is noted in Example I, that for compositions 1–2 through 1–2 which contained 2-methyl-1,3-propanediol the breakdown voltage is substantially increased over composition 1–1 which utilizes only ethylene glycol as the solvent.

EXAMPLE II

This Example shows the improvement in thermal stability by adding ammonium pentaborate (APB). Test electrolytes (1–2 and 1–6) were heated at 105° C. and the pH and $\rho$ values were measured after heating.

TABLE 2

| | pH | $\rho$@30° C., $\Omega$-cm |
|---|---|---|
| Composition 1-2 | | |
| initial | 7.5 | 900 |
| 288 hours @105° C. | — | 1265 |
| 480 hours @105° C. | — | 1351 |
| 816 hours @105° C. | 9.2 | 1568 |
| 1900 hours @105° C. | 9.1 | 2145 |
| Composition 1-6 | | |
| initial | 6.9 | 915 |

TABLE 2-continued

| | pH | ρ@30° C., Ω-cm |
|---|---|---|
| 288 hours @105° C. | — | 1023 |
| 480 hours @105° C. | — | 1042 |
| 816 hours @105° C. | 7.5 | 1048 |
| 1900 hours @105° C. | 7.7 | 1216 |

It is seen that electrolyte composition 1–6 which included ammonium pentaborate improves the thermal stability of the electrolyte of the present invention.

EXAMPLE III

This Example shows the low temperature properties of the electrolyte of the present invention which contains 2-methyl-1,3-propanediol in comparison with an electrolyte composition which uses polyethylene glycol 400 as a co-solvent with ethylene glycol. The electrolyte composition of this Example was prepared in the same manner as those prepared in Example I. Table 3 shows the electrolyte compositions that were impregnated into two wound capacitor sections. The equivalent series resistance and the capacitance of these capacitor sections at several low temperatures are also shown in the Table.

TABLE 3

| | ELECTROLYTE COMPOSITION | |
|---|---|---|
| | 3-1 | 3-2 |
| FORMULATIONS: | | |
| ethylene glycol, mL | 74 | 83 |
| 2-methyl-1,3-propanediol, mL | 26 | — |
| polyethylene glycol 400, mL | — | 17 |
| Sebacic acid, g. | 4.0 | 4.0 |
| ammonium hydroxide (28%), mL | 2.5 | 2.5 |
| TEMPERATURE: | | |
| 22° C. | 0.21Ω/499 μF | 0.23Ω/499 μF |
| 0° C. | 0.43Ω/479 μF | 0.51Ω/479 μF |
| –17° C. | 0.91Ω/463 μF | 1.37Ω/456 μF |
| –35° C. | 2.26Ω/445 μF | 3.91Ω/427 μF |
| –45° C. | 12.2Ω/336 μF | 41.4Ω/119 μF |

From the data of Table 3 it is seen that using an electrolyte including 2-methyl-1,3-propanediol results in a much smaller increase in series resistance at low temperature and retention of a higher capacitance than with an electrolyte using polyethylene glycol as the co-solvent with ethylene glycol.

EXAMPLE IV

This Example shows the performance of a capacitor prepared with a preferred electrolyte composition of the present invention.

The electrolyte composition of the present invention was utilized in the making of an aluminum electrolytic capacitor. The capacitor was made by recognized prior art techniques. Specifically, a cylindrical capacitor element was wound by wrapping strips of anode and cathode foils, separated by layers of paper sheets, around a central mandrel. Connector tabs of narrow sheet stock were attached to the foil before this winding operation. Before assembly into a finished capacitor, the wound elements were vacuumed dried to remove excess moisture that may have been absorbed into the spacer paper. The wound element was then impregnated with the electrolyte identified in Table I as electrolyte composition 1–7, inserted into a capacitor case and then sealed and aged. For aging, the capacitor was connected to a power supply and a resistor that limited the maximum current to the capacitor. The supplied voltage caused the voltage on the capacitor to slowly rise to its rated value, which deposited oxide on anode foil edges and on metal exposed at the anode foil connections. The results of (1) the load tests at 450 V and 105° C.; (2) the shelf life at 105° C. with no voltage applied; and (3) a surge test at 105° C./500 VDC for 1000 cycles are shown in Table 4.

TABLE 4

| | Initial | 250 hrs | 500 hrs | 1000 hrs |
|---|---|---|---|---|
| (1) Load Test | | | | |
| Leakage current (105° C.) | 41 μ | 41 μA | 40 μA | 40 μA |
| Capacitance | 985 μF | 979 μF | 973 μF | 956 μF |
| ESR, 120 Hz, 25° C. | 60 mΩ | 81 mμΩ | 90.5 mΩ | 108 mΩ |
| Dissipation factor | 4.42% | 5.98% | 6.64% | 7.82% |
| | Initial | 100 hrs | 500 hrs | |
| (2) Shelf Life | | | | |
| Leakage current (25° C.) | 50 μA | 270 μA | 400 μA | |
| Capacitance | 988 μF | 969 μF | 963 μF | |
| ESR, 120 Hz, 25° C. | 59 mΩ | 62 mΩ | 76 mΩ | |
| Dissipation factor | 4.41% | 4.53% | 5.49% | |
| | Initial | 1000 cycles | | |
| (3) Surge Test | | | | |
| Leakage current (25° C.) | 50 μA | 50 μA | | |
| Capacitance | 987 μF | 962 μF | | |
| ESR, 120 Hz, 25° C. | 61 mΩ | 81 mΩ | | |
| Dissipation factor | 4.53% | 5.86% | | |

Electrical parameters are acceptable over the test duration.

The present invention has been described with reference to particular embodiments thereof. It will be understood that modifications may be made by those skilled in the art without departing from the spirit and scope of the present invention, in accordance with the claims appended hereto.

What is claimed is:

1. An electrolyte composition for electrolytic capacitors comprising:

2-methyl-1,3-propanediol, ethylene glycol, and an ammonium salt of a straight chain dicarboxylic acid or a branched chain di- or polycarboxylic acid or mixtures thereof.

2. The electrolyte composition of claim 1 wherein the acid is selected from the group consisting of:

1) straight chain dicarboxylic acids having 4 or more carbon atoms and 2) branched chain di- or polycarboxylic acids having 2 or more carbons between $CO_2H$ groups.

3. The electrolyte composition of claim 1 wherein said straight chain dicarboxylic acid has 4 or more carbon atoms.

4. The electrolyte composition of claim 1 wherein the branched chain di- or polycarboxylic acid is an acid in which the $CO_2H$ groups are separated by an alkyl chain having at least 2 carbon atoms.

5. The electrolyte composition of claim 1 including a borate compound.

6. The electrolyte composition of claim 5 wherein the borate compound is boric acid or ammonium pentaborate.

7. The electrolyte composition of claim 5 wherein the borate compound is from 0.1 to 5 parts by weight of the total electrolyte composition.

8. The electrolyte composition of claim 1 wherein said 2-methyl-1,3-propanediol is from 5 to 80 parts by weight of total electrolyte composition.

9. The electrolyte composition of claim 1 wherein the ethylene glycol is from 10 to 90 parts by weight of total electrolyte composition.

10. The electrolyte composition of claim 1 wherein the ammonium salt of a straight chain dicarboxylic acid or a branched chain di- or polycarboxylic acid is from 1 to 10 parts by weight of total electrolyte composition.

11. The electrolyte composition of claim 1 including water.

12. The electrolyte composition of claim 11, said water being less than five percent by weight of total electrolyte composition.

13. The electrolyte composition of claim 1 wherein the 2-methyl-1,3-propanediol is from 5 to 80 parts by weight of total electrolyte composition, the ethylene glycol is from 10 to 90 parts by weight of total composition, and the ammonium salt of a straight chain dicarboxylic acid or a branched chain di- or polycarboxylic acid is from 1 to 10 parts by weight of total electrolyte composition.

14. The electrolyte composition of claim 13 including a borate compound of from 0.1 to 5 parts by weight of total electrolyte composition.

* * * * *